United States Patent [19]

Gold et al.

[11] Patent Number: 4,664,363
[45] Date of Patent: May 12, 1987

[54] HYDRAULIC-ELASTOMERIC MOUNT DISPLACEMENT DECOUPLER

[75] Inventors: Thomas P. Gold, Westchester, Ohio; John E. Vogel, Ann Arbor, Mich.

[73] Assignee: General Motors Corporation, Detroit, Mich.

[21] Appl. No.: 785,243

[22] Filed: Oct. 7, 1985

[51] Int. Cl.⁴ .................. F16M 5/00; B60G 15/04
[52] U.S. Cl. ................. 267/140.1; 248/636; 267/8 R
[58] Field of Search .... 267/140.1, 140.4, 141.2–141.7, 267/8 R, 35, 63 A, 63 R, 122, 123; 180/300; 248/562, 636, 638, 659; 188/298

[56] References Cited

U.S. PATENT DOCUMENTS

| | | | |
|---|---|---|---|
| 4,159,091 | 6/1979 | Le Salver et al. | 267/140.1 X |
| 4,277,056 | 7/1981 | Ticks | 267/140.1 |
| 4,433,521 | 11/1984 | Kakimoto | 267/8 R |
| 4,437,653 | 3/1984 | Kakimoto | 267/140.1 |
| 4,588,173 | 5/1986 | Gold et al. | 267/140.1 |

FOREIGN PATENT DOCUMENTS

| | | |
|---|---|---|
| 0098331 | 1/1984 | European Pat. Off. |
| 0945899 | 7/1956 | Fed. Rep. of Germany . |
| 3140783 | 4/1983 | Fed. Rep. of Germany ........ 267/1401.1 |
| 3347274 | 7/1985 | Fed. Rep. of Germany ...... 248/562 |
| 3407553 | 9/1985 | Fed. Rep. of Germany ...... 248/562 |
| 2041485 | 9/1980 | United Kingdom . |
| 2068079 | 8/1981 | United Kingdom . |

*Primary Examiner*—Andres Kashnikow
*Assistant Examiner*—Robert J. Oberleitner
*Attorney, Agent, or Firm*—R. L. Phillips

[57] ABSTRACT

A hydraulic-elastomeric mount is disclosed having a hydraulic damping decoupler mounted for reciprocal movement in a partition in response to alternating pressure buildup in two orifice connected chambers so as to effect cyclic volume change in the chambers to thereby permit vibratory amplitudes below a prescribed level without forcing liquid through the orifice and thus without hydraulic damping thereby and while also providing for limited flow through the partition between the chambers in bypass relation to the orifice so as to effect limited damping during decoupler operation and smooth transition between damping and no damping by the orifice.

2 Claims, 11 Drawing Figures

HYDRAULIC-ELASTOMERIC MOUNT DISPLACEMENT DECOUPLER

TECHNICAL FIELD

This invention relates to hydraulic-elastomeric displacement decouplers and more particularly to also providing damping thereby.

BACKGROUND OF THE INVENTION

In hydraulic-elastomeric mounts such as used for mounting an internal combustion engine in a motor vehicle, a hydraulic damping decoupler can be employed to eliminate undesirable hydraulic damping at certain small vibratory amplitudes and low frequencies and thereby better isolate the vibrations of the engine under these conditions. Such decouplers are normally reciprocating devices which operate to effect alternating volume change in the two orifice connected chambers of the mount so as to not force flow through the orifice and thereby eliminate damping in this mode. While the performance of such decouplers has proven generally satisfactory, it has been found that the abrupt volume changes that they produce because of such reciprocation are in the form of a step function and can be sensed in the vehicle both in the undamped mode and as a distinct transition between this mode and the damped mode.

SUMMARY OF THE INVENTION

The object of the present invention is to avoid such abrupt volumetric change by the decoupler and instead have it perform with a smooth sine-like function rather than a step function in its damping decoupler mode. It has been discovered that this can be accomplished very simply by effecting limited bypass flow past the decoupler in parallel with the orifice normally connecting the mount chambers. As a result, some damping is maintained rather than totally eliminated by the decoupler so as to provide a smooth and substantial but not total elimination of hydraulic damping at the small vibratory amplitudes and low frequencies where minimum damping is desired for best engine vibration isolation. In the preferred embodiment, a baffle and reservoir arrangement is employed in the bypass route past the decoupler with the former providing flow restriction to assure the maintenance of some damping and the latter providing room to which the bypass fluid may escape so as to maintain smooth damping decoupler operation.

These and other objects, advantages and features of the present invention will become more apparent from the following description and drawings in which:

DESCRIPTION OF THE DRAWINGS

FIG. 3 is a sectional view taken along the line 3—3 in FIG. 1.

Figure 1:
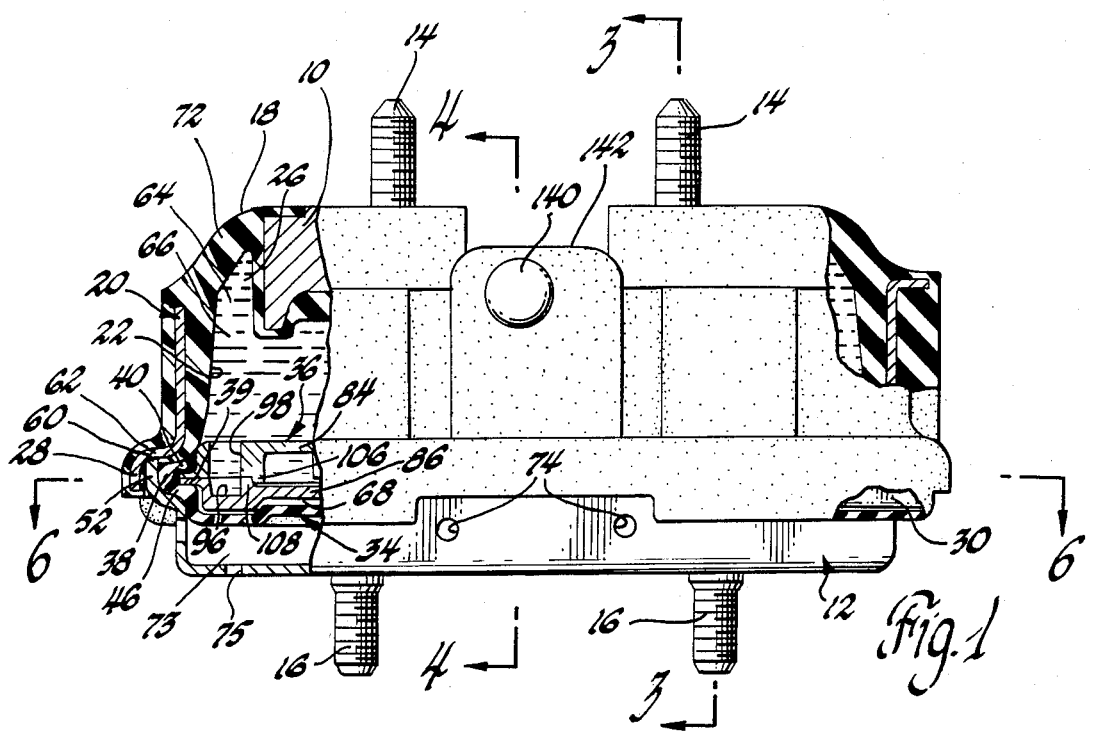
FIG. 1 is a side view partially in section of a hydraulic-elastomeric mount incorporating the preferred embodiment of the present invention.

Referring to the drawings, there is shown a hydraulic-elastomeric mount incorporating the present invention and adapted for mounting an internal combustion engine motor in a vehicle. The mount has a generally rectangular shape as viewed from the side in FIG. 1 and a generally oval shape as viewed from the top in FIG. 2 and comprises a yoke-shaped cast aluminum mounting member 10 and an oval dish-shaped stamped sheet metal mounting member 12. The mounting members 10 and 12 each have a pair of studs 14 and 16 respectively projecting outward therefrom for attachment respectively to an engine (not shown) and an engine supporting member such as a frame or cradle (not shown) of the vehicle. A hollow elastomeric body 18 of natural or synthetic rubber interconnects the mounting members 10 and 12 and to this end, is molded to and about the yoke-shaped mounting member 10 and to both the interior and exterior of an oval-shaped stamped sheet metal retainer 20.

Figure 2:
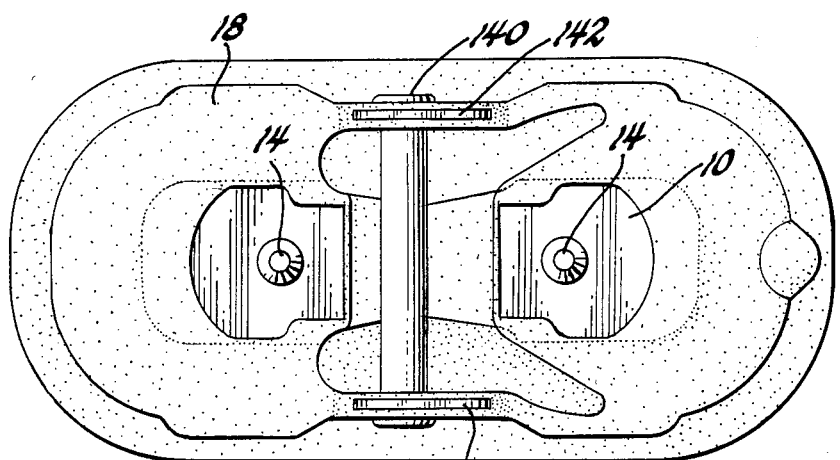
FIG. 2 is a top view of the hydraulic-elastomeric mount in FIG. 1.
Figure 4:
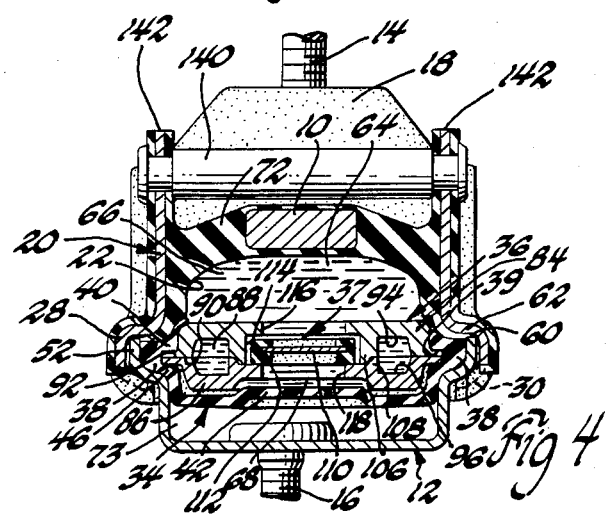
FIG. 4 is a sectional view taken along the line 4—4 in FIG. 1.
Figure 7:
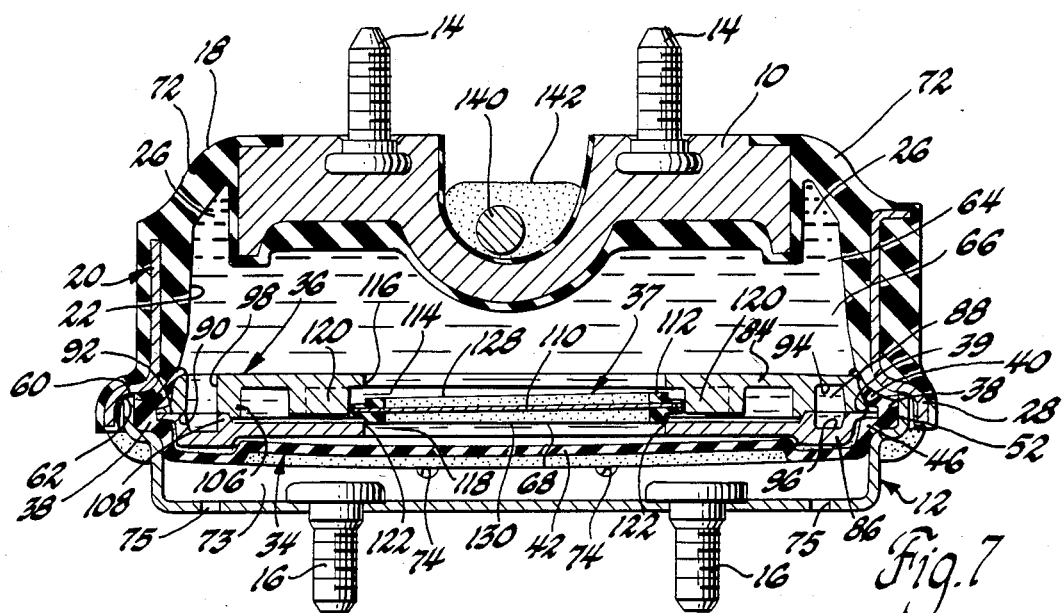
FIG. 7 is a sectional view taken along the line 7—7 in FIG. 6.

The elastomeric body is configured such that it essentially completely defines a hollow cavity 22 therein extending beneath and about the yoke-shaped mounting member 10 and interiorly of the retaining member 20 so as to positively prevent any leakage from the cavity outwardly past these parts while also having extensive surface attachment therewith. Moreover, the mounting member 10 with its studs 14, the elastomeric body 18 and the retainer 20 form a subassembly shown and designated as 24 in FIG. 5. It will be seen that the subassembly 24 is configured such that the elastomeric body can be molded to these parts in a conventional two-piece mold without separate or loose core pieces using either injection or transfer molding and with little finishing such as flash rubber removal required. And this includes the formation of directional rate control effecting voids within the elastomeric body itself and as a part of the liquid cavity. For example, with oppositely located voids 26 between the yoke 10 and retainer 20 at the remotest ends of the mount as seen in FIGS. 1 and 7, the mount is provided with a high or hard rate in one crosswise direction and both a relatively soft or low rate at low amplitudes and a non-linear high or hard rate at high amplitudes in a direction transverse thereto (vertical and horizontal directions respectively as viewed from the top in FIG. 2). As is well known in the art, such differences in rates are especially useful in isolating certain combustion engine vibrations.

Figure 5:
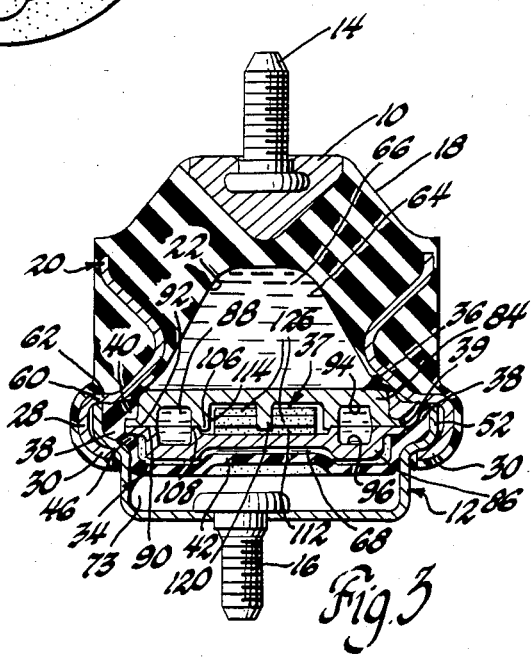
FIG. 5 is an exploded view of certain parts of the hydraulic-elastomeric mount in FIG. 1.
Figure 5:
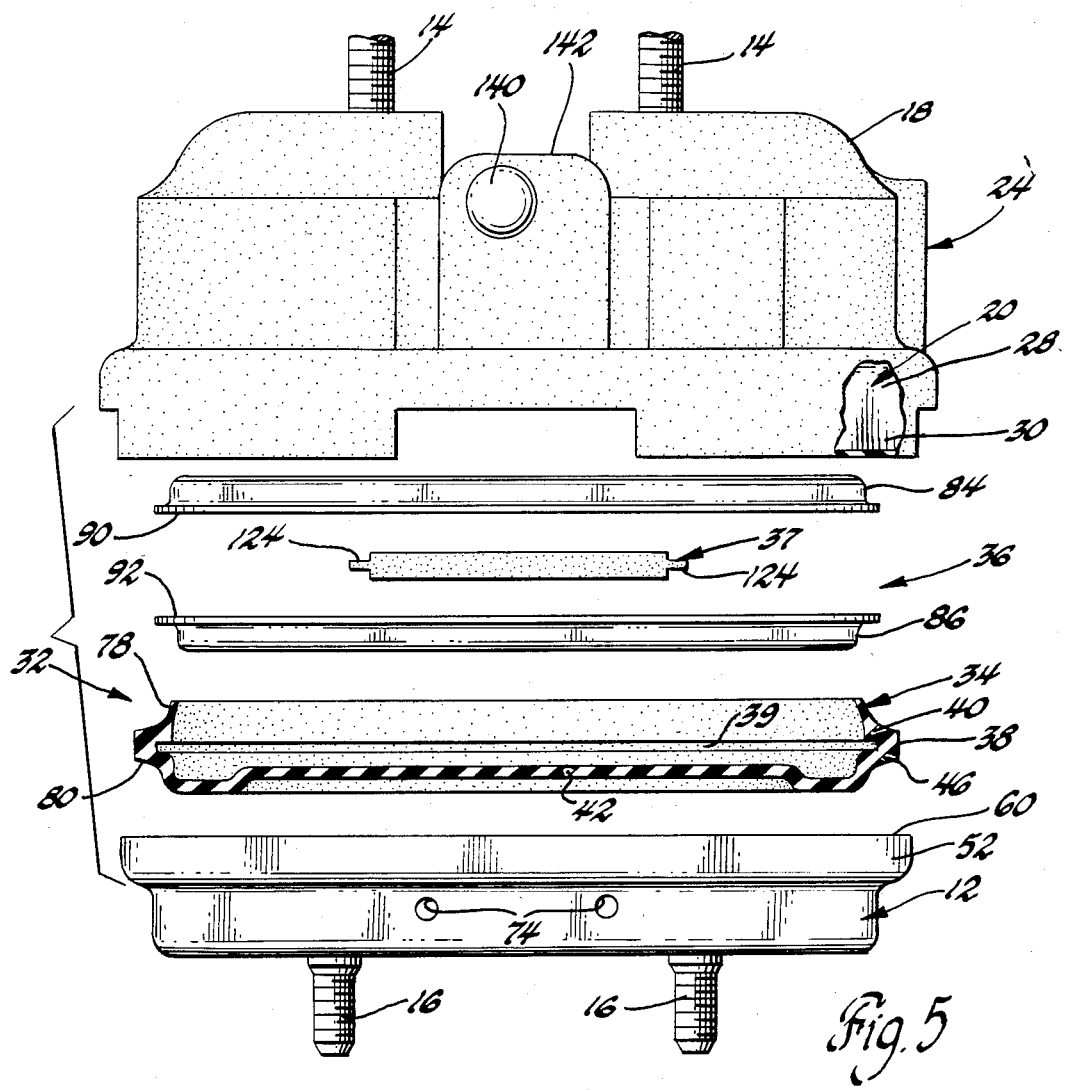

The retainer 20 has an outwardly projecting collar 28 at its lower periphery with a plurality of circumferentially spaced tabs 30 which are initially formed to project straight downward to allow the collar 28 to receive a second subassembly 32 as shown in FIG. 5. The latter subassembly 32 comprises the other mounting member 12, an oval-shaped elastomeric diaphragm 34 of natural or synthetic rubber, an oval-shaped partition and orifice assembly 36 and a hydraulic damping decoupler 37. The elastomeric diaphragm 34 has an annular rim section 38 with a radially inwardly facing internal groove 39 and with the shoulder 40 on the side of the groove opposite the spanning central portion 42 of the diaphragm being flexible to receive the periphery of the partition and orifice assembly 36. The periphery of the partition and orifice assembly is thus sandwiched as shown in FIGS. 1, 3, 4 and 7 between the shoulder 40 and the shoulder 46 on the opposite side of the groove, the latter shoulder being formed integral with and extending radially outward from the central diaphragm portion 42 to join the latter with the diaphragm rim portion 38.

The lower mounting member 12 is formed with a collar 52 to receive the rim 38 of the diaphragm 34 with the partition and orifice assembly 36 in place and the damping decoupler 37 having been previously assembled to the latter as will be described in more detail later and with such subassembly then adapted to be fit into the collar 28 of the retainer 20 of the other subassembly 24 prior to bending over of the tabs 30 to retain the whole mount assembly together. In such fit, the lower mounting member 12 is telescopically received in the retainer collar 28 with the rim 38 of the diaphragm pressed therebetween whereafter the tabs 30 of the retainer are bent over the collar 52 of the lower mounting member to retain the subassemblies 24 and 32 together as shown in FIGS. 1, 3, 4 and 7. In such assembly, the upper edge 60 of the collar 52 of the lower mounting member 12 engages the radial shoulder 62 of the collar 28 of the retainer 20 to determine the preload on the diaphragm rim 38 which plays a part in amplitude control as well as sealing as will be described in more detail later.

The elastomeric diaphragm 34 closes the elastomeric body 18 so as to form therewith a closed cavity generally designated as 64 which is divided by the partition and orifice assembly 36 into a primary chamber 66 enclosed by the elastomeric body 18 and a secondary chamber 68 enclosed by the diaphragm 34. However, prior to the closure of the cavity 64 at assembly, it is filled, as will be described in further detail later, with a liquid such as a commercial engine anti-freeze coolant.

Assuming at this point that there is an orifice interconnecting the chambers 66 and 68, liquid in the primary chamber is forced to flow through such orifice at a restricted rate into the secondary chamber upon contraction of the primary chamber and in the opposite direction on expansion thereof to thereby provide a damping effect. Upon contraction of the primary chamber 66, the wall section 72 of the elastomeric body 18 extending between the mounting member 10 and the retainer 20 (see FIGS. 1, 4 and 7) is caused to bulge outwardly while the liquid therein is forced to flow through the orifice into the chamber 68 to expand the latter as permitted by the elasticity of the diaphragm's central portion 42. Then on reversal in amplitude and resultantly expansion of the primary chamber 66, the stretched central diaphragm portion 42 retracts and thereby contracts the secondary chamber 68 forcing the liquid to flow back through the orifice into the primary chamber to complete the damping cycle. To assure otherwise free expansion and contraction of the secondary chamber 68, the space 73 between the diaphragm 34 and the lower mounting member 12 is vented to atmosphere through a plurality of holes 74 formed in the side of the latter part. In addition, a plurality of drain holes 75 are provided in the bottom of the lower mounting member 12 to prevent the accumulation of water therein which might freeze and present an obstacle to the movement of the diaphragm 34.

By virtue of the diaphragm 34 being configured at its rim 38 to both extend around and over the periphery of the partition and orifice assembly 36, there is formed a seal not only between the chambers but also a double seal between the chambers and the exterior resulting in excellent sealed integrity of the mount. Moreover, the diaphragm rim 38 is configured so as to permit limited substantially free or soft travel of the partition and orifice assembly 36 relative to the mounting members 10 and 12 below a predetermined low vibration amplitude of one mounting member relative to the other and to prevent such relative travel above such amplitude so that flow through the orifice between the chambers to effect damping does not occur until such prescribed low vibration amplitude is exceeded. For example, such free travel of the partition and orifice assembly 36 may be as much as ±1.0 mm depending on the installation.

This limited substantially uninhibited partition movement provides precise amplitude control and is simply effected with a predetermined compliance of the diaphragm rim 38 between the sandwiching retainer 20 and lower mounting member 12. To this end, the diaphragm rim 38 is free formed as shown in FIG. 5 so as to have adjacent its perimeter an annular upstanding sealing bead 78 and an annular arcuate sealing face 80 that face in opposite directions. The sealing bead 78 has more effective compliance than the radially inwardly extending wall sections of the groove shoulders 40 and 46 and is deflected at assembly as shown in FIGS. 1, 3, 4 and 7 so as to tightly seal against the rubber on the interior lip of the retainer collar shoulder 62 while these partition capturing elastomeric shoulder or wall sections are preloaded to a predetermined extent dependent on the amplitude responsiveness desired as determined by the edge 60 of the lower mounting member engaging this shoulder. On the other hand, the hydraulically biased partition and orifice assembly 36 is alternately forced against the elastomeric shoulders 40 and 46 of the diaphragm rim so as to maintain tight sealing between the chambers 66 and 68.

Figure 6:
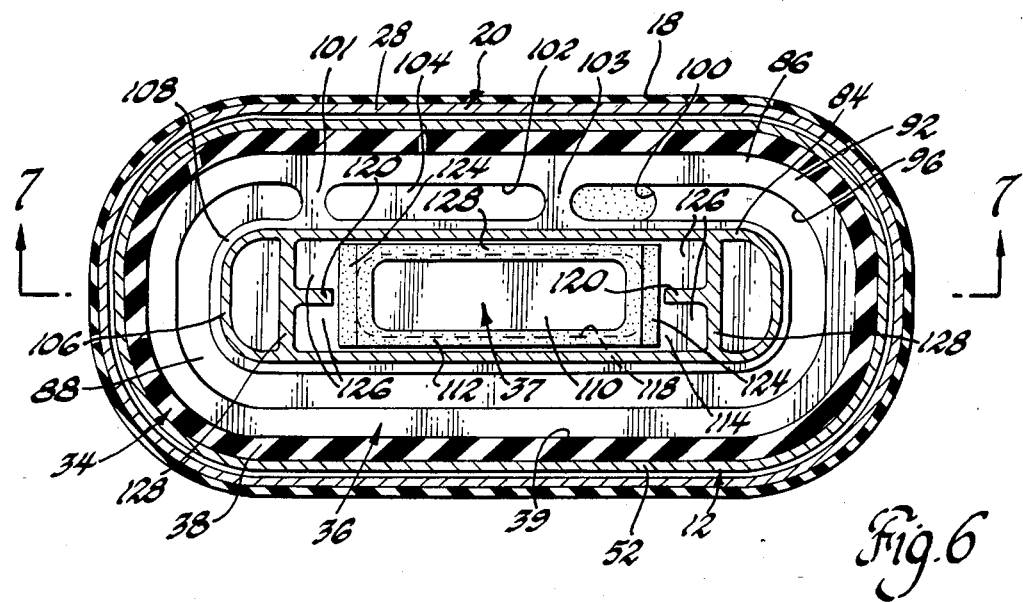
FIG. 6 is a sectional view taken along the line 6—6 in FIG. 1.

The partition and orifice assembly 36 is of die-cast metal construction as shown or may be plastic and comprises a pair of oval-shaped partition plates 84 and 86 with matching peripheries. As best seen in FIGS. 1, 3, 4, 6 and 7, both these plates span the cavity 64 to separate the chambers 66 and 68 and also cooperate to define a damping orifice 88 interconnecting the two chambers. To the latter end, the respective plates 84 and 86 have flat annularly extending mating faces 90 and 92 that are each formed with a double-ended channel 94 and 96 therein of uniform depth and cross-section and wall thickness, and which cooperatively define the orifice 88 as a planar (nonspiraling) passage extending between the plates along and adjacent their periphery in an oval path just inwardly of and along the diaphragm rim 38. In addition, the plates 84 and 86 are each formed with a right-angle opening 98 and 100 therethrough to one end only of their respective channel 94 and 96 and thereby to one end only of the orifice 88 so that it interconnects the chambers and has a length which may thereby be made substantially as expansive as the periphery of the plates as best seen in FIGS. 3, 4, 6 and 7. On the other hand, one or both of the openings 98 and 100 may be made longer along their plate to shorten the effective length of the orifice to a desired length best suited to the particular vibratory system. Moreover, there may be formed a dam 101 in each channel as shown in FIG. 6 in the channel 96 of plate 86 resulting in a still shorter effective orifice if desired and in addition a short dead channel 102 that is blocked from the remainder of the active channel 96 by the resulting dam 103. A similar dead channel and dam arrangement is formed in the opposite partition plate 84 and together they form a dead space 104 to prevent leakage past the plate faces that would bypass the orifice. Furthermore, it will be seen in FIGS. 1, 3, 4, 6 and 7 that there are provided oval extending telescoping shoulders 106 and 108 on the respective partition plates 84 and 86 to locate and maintain proper alignment of the latter and in particular their channels.

Turning now to the hydraulic damping decoupler 37, this device is simply a rectangular plate 110 that is formed of metal as shown or plastic and has an elastomeric cushion 112 of natural or synthetic rubber molded thereto about the perimeter thereof. The decoupler 37 is mounted for limited up and down movement in a cavity 114 that is formed between the partition plates 84 and 86 and is open through these plates through respective rectangular shaped openings 116 and 118 therein to the respective chambers 66 and 68 as best seen in FIGS. 3, 4 and 6-9.

Figure 8:
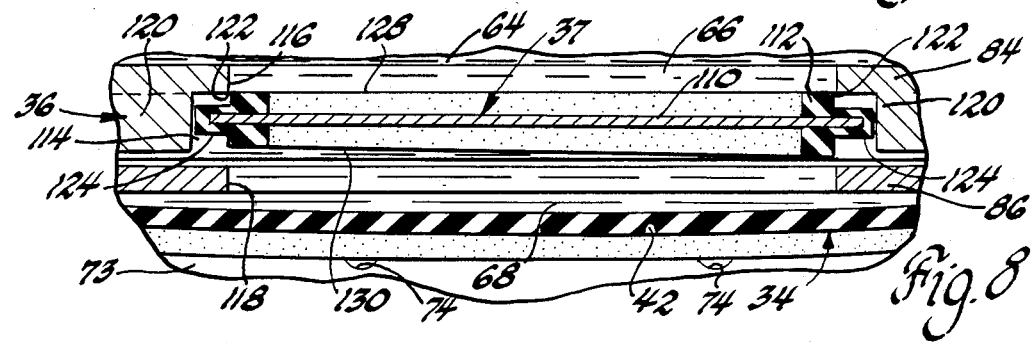
FIG. 8 is an enlarged view of the decoupler from FIG. 7 showing the decoupler in its other extreme position.
Figure 9:
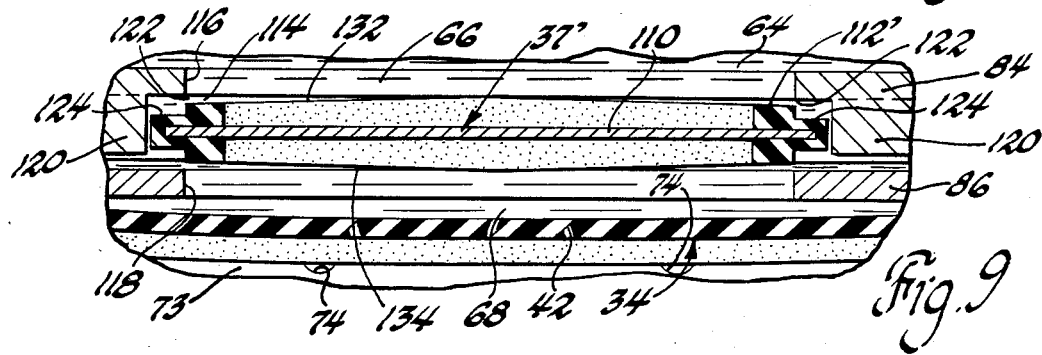
FIG. 9 is an enlarged view similar to FIG. 8 but of another embodiment of the decoupler for the hydraulic-elastomeric mount in FIG. 1.

Limited volume change in the chambers 66 and 68 to effect hydraulic decoupling (elimination of the hydraulic damping) below a prescribed low amplitude at low frequencies is provided by the reciprocating movement of the decoupler 37 in response to the alternating pressure buildups in these chambers acting on the opposite sides of the decoupler plate 110 which is free to travel between the partition plates in response thereto. As best seen in FIGS. 7-9, the decoupler plate 110 is longer and wider than the plate openings 116 and 118 but the face length of the cushion 112 is substantially the same as that of the openings while the face width of the cushion is like the decoupler plate larger than the partition plate openings 116 and 118. The upper partition plate 84 is formed adjacent the ends of its opening 116 with guide ribs 120 against which the ends of the decoupler locate and guide on while the sides of the decoupler locate against and guide on oppositely facing portions of the interior side of the shoulder 106 on the upper partition plate. The decoupler is located lengthwise by the ribs 120 in its reciprocal up and down movement so that the cushion 112 may be dimensioned lengthwise relative to the openings 116 and 118 such that a small opening or passage 122 as seen in FIGS. 8 and 9 remains past one or both ends of the decoupler connecting the chambers 66 and 68 when the cushion 112 on the decoupler is otherwise sealing about the opening 116 or 118 of either of the partition plates.

The decoupler 37 by virtue of its limited free travel with respect to the partition in response to slow alternating pressure buildup in the two chambers 66 and 68 thus effects cyclic volume change in the chambers so as to permit small vibratory amplitudes at low frequencies such as up to 2 Hz without forcing liquid to flow therebetween through the orifice 88 but while limited bypass liquid flow relative to the orifice is permitted to pass by the decoupler itself through the bypass passage(s) 122 and partition plate openings 116 and 118. Moreover, it will be seen that the projecting ends 124 of reduced cushion thickness serve as baffles further restricting the bypass flow to assure that some appreciable damping is made to occur thereby. Thus, hydraulic damping is almost but not totally eliminated by a predeterminable amount below a prescribed low vibratory amplitude for further amplitude control in the mount apart from that provided by the above-described diaphragm rim 38 with its designed in compliance. And importantly, the bypass flow particularly with the baffling thereof by the decoupler produces this slight damping with a sine-like wave form rather than a step wave in the essentially non-damping mode to avoid sensing of what would otherwise be abrupt changes in this mode and in the transition between this mode and the damping mode by the orifice 88. The damping decoupler 37 also substantially extends the range of usage of the mount in that the amplitude control by the diaphragm rim is relatively limited and may better remain constant in size so as not to require changes in the associated other parts while the damping decoupler can be readily tuned to meet various amplitude control criteria without requiring other changes in the mount simply by varying its size and/or extent of movement.

In addition, it has been found that this damping function by the decoupler bypass flow is smoothened by forming dead spaces 126 between the partition plates 84 and 86 on opposite sides of the ribs 120 and adjacent the ends of the decoupler baffles 124 through the formation of transverse wall sections 128 on the upper partition plate 84. In the decoupler bypass mode, these dead spaces or reservoirs 126 provide room to which the bypass flow may escape resulting in smoother bypass flow and thus a smoother damping function in this mode.

Figure 11:
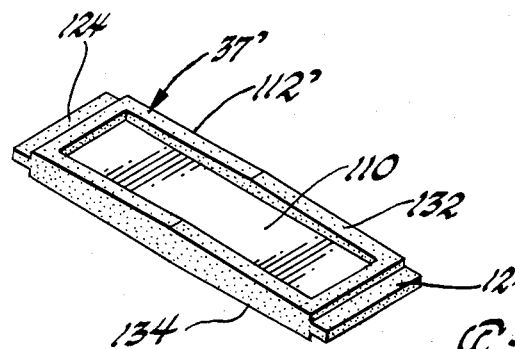
FIG. 11 is an isometric view of the decoupler in FIG. 9.
Figure 10:
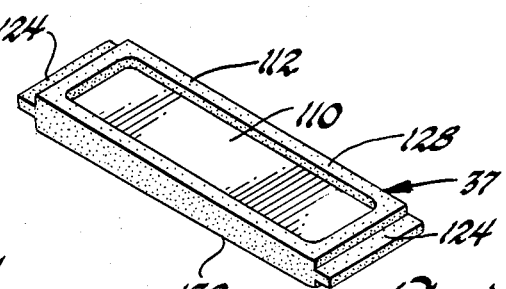
FIG. 10 is an isometric view of the decoupler in FIGS. 3-8.

There are shown two embodiments of the decoupler 37 and 37' which in addition to performing the bypass function also have their cushion 112 and 112' formed in a manner to substantially eliminate noise produced by the decoupler seating on the partition plates 84 and 86 about their respective openings 116 and 118. Normally, the cushion 112 or 112' would have parallel flat faces on opposite sides and they would slap against the partition plates causing noise. This is prevented with the embodiment in FIGS. 7, 8 and 10 by tapering or angling the one face 130 while the other face 128 is made parallel to the decoupler plate 110. This causes the decoupler 37 to rock rather than flatly slap against the partition plates as it reciprocates in its decoupling mode between its two positions shown in FIGS. 7 and 8 and this in addition to the noise reducing effect of the cushion material itself results in quiet operation of the decoupler. In the embodiment in FIGS. 9 and 11, a similar noise reducing effect is provided by forming double taper faces 132 and 134 with centered apexes to produce rocking of the decoupler.

The assembly of the hydraulic-elastomeric mount is simplified in that the decoupler 37 or 37' is simply positioned between the two plates 84 and 86 forming the partition and orifice assembly 36 and thereafter all these parts may be preassembled in the diaphragm 34 and then mounted therewith on the lower mounting member 12 to form the subassembly 32. Then at final assembly, this main subassembly is simply brought together with and secured by the tabs 30 to the retainer 20 of the other main subassembly 24 and preferably while both are fully submerged in the liquid to assure full fillage of the chambers.

Also, it will be recalled that the retainer 20 is connected by the elastomeric body 18 to the upper mounting member 10 but is mechanically connected to the lower mounting member 12 by the bent over tabs 30 at final assembly. To assure that the mounting members 10 and 12 remain connected in the event that the elastomeric connection between the retainer 20 and the mounting member 10 is lost, there is provided a steel pin 140 which straddles the yoke-shaped mounting member 10 between its studs 14 and is secured at its opposite ends to a pair of upstanding flanges 142 formed on the retainer 20 as shown in FIGS. 1, 2, 4 and 7.

The hydraulic-elastomeric mount by benefit of the present invention may thus be readily adapted and tuned to meet a specific application to give the desired amplitude control as well as the coefficient of damping and resulting dynamic rate best suited to isolate a particular set of vibration conditions. And thus a family of mounts is cost-effectively offered with selectability of such important parameters as dynamic rate as well as amplitude control and in a very compact manner. Furthermore, it will be appreciated by those skilled in the art that while the specific embodiment shown and described in detail is the preferred construction, other practical embodiments may result from these teachings.

The above described preferred embodiment is thus illustrative of the invention which may be modified within the scope of the appended claims.

The embodiments of the invention in which an exclusive property or privilege is claimed are defined as follows:

1. A hydraulic-elastomeric mount comprising a pair of mounting members, a hollow elastomeric body means interconnecting said mounting members, an elastomeric diaphragm means closing said elastomeric body and forming therewith a closed cavity that is filled with liquid, a partition sealingly mounted at and about the periphery thereof in said mount and spanning said cavity so as to divide same into a chamber enclosed by said elastomeric body and a chamber enclosed by said diaphragm, and an elongated orifice connecting said chambers to effect damping, characterized by the combination of elastomeric means sandwiching and supporting said partition between said mounting members so as to permit limited substantially free travel of said partition below a predetermined vibration amplitude of one mounting member relative to the other so that flow through said orifice and thereby damping does not occur below said predetermined amplitude, and hydraulic damping decoupler means mounted in and between openings through said partition between said chambers for reciprocal movement in said partition in response to alternating pressure buildup in said chambers wherein said decoupler means alternately sealingly seats on opposite sides thereof with said partition about said openings so as to effect cyclic volume change in said chambers to thereby permit vibratory amplitudes below a prescribed level without forcing liquid through said orifice and thus without hydraulic damping thereby supplementary to that provided by the partition travel and while also cooperating with said partition to form a decoupler bypass passage through said openings during decoupler means movement prior to said seating to provide for limited flow through said partition between said chambers in bypass relation to said orifice so as to effect limited damping during decoupler operation and smooth transition between damping and no damping by said orifice.

2. A hydraulic-elastomeric mount as set forth in claim 1 further characterized by said decoupler means having baffle means extending partially across said bypass passage for restricting the bypass flow through said bypass passage during decoupler means movement.

* * * * *